(12) United States Patent
Nishida et al.

(10) Patent No.: US 7,730,600 B2
(45) Date of Patent: Jun. 8, 2010

(54) METHOD, SYSTEM, AND APPARATUS FOR DETACHING AND COLLECTING AN IC TAG FROM A PAPER SHEET TO WHICH IT IS ATTACHED

(75) Inventors: Nobukatsu Nishida, Ootsu (JP); Hiroshi Iwata, Mihara (JP); Toshihiko Kawanami, Mihara (JP); Toshimi Tajima, Mihara (JP)

(73) Assignees: Sagawa Printing Co., Ltd. (JP); Nobukatsu Nishida (JP)

( * ) Notice: Subject to any disclaimer, the term of this patent is extended or adjusted under 35 U.S.C. 154(b) by 1133 days.

(21) Appl. No.: 10/533,581

(22) PCT Filed: Jan. 21, 2004

(86) PCT No.: PCT/JP2004/000478

§ 371 (c)(1),
(2), (4) Date: May 3, 2005

(87) PCT Pub. No.: WO2004/065029

PCT Pub. Date: Aug. 5, 2004

(65) Prior Publication Data

US 2006/0125636 A1    Jun. 15, 2006

(30) Foreign Application Priority Data

Jan. 22, 2003    (JP)    ............................. 2003-013367

(51) Int. Cl.
*B29C 63/00*    (2006.01)
*B23P 19/00*    (2006.01)
*B23P 19/02*    (2006.01)

(52) U.S. Cl. ..................... 29/426.4; 29/426.5; 156/247; 156/344; 156/395; 156/584

(58) Field of Classification Search ................. 29/426.5, 29/426.4; 156/344, 395, 584, 247; 340/572.1; 399/1, 390
See application file for complete search history.

(56) References Cited

U.S. PATENT DOCUMENTS 4,342,425 A * 8/1982 Vickers ....................... 239/424

(Continued)

FOREIGN PATENT DOCUMENTS

JP    52-125582 A    10/1977

(Continued)

OTHER PUBLICATIONS

Abstract of JP 2003016415 Jan. 17, 2003 Kato Shunichi et al.

(Continued)

*Primary Examiner*—David P Bryant
*Assistant Examiner*—Alexander P Taousakis
(74) *Attorney, Agent, or Firm*—Lowe Hauptman Ham & Berner, LLP

(57) ABSTRACT

In order to efficiently detach and collect an IC tag (1) from a paper sheet (2) to which the IC tag (1) is attached, the IC tag (1) is detached from the paper sheet (2) by applying external force to the adhesive surface between the paper sheet (2) and the IC tag (1) (detachment step). Next, the detached IC tag (1) is fractionated from other substances (fractionation step).

7 Claims, 7 Drawing Sheets

U.S. PATENT DOCUMENTS

| | | | | | |
|---|---|---|---|---|---|
| 5,607,534 | A | * | 3/1997 | Kawanishi et al. | 156/234 |
| 5,619,765 | A | * | 4/1997 | Tokita et al. | 15/3 |
| 5,652,989 | A | * | 8/1997 | Chiba et al. | 15/3 |
| 5,694,657 | A | * | 12/1997 | Yoshida et al. | 15/88.3 |
| 2004/0161592 | A1 | * | 8/2004 | Yoshida et al. | 428/202 |

FOREIGN PATENT DOCUMENTS

| | | |
|---|---|---|
| JP | 9-38629 A | 2/1997 |
| JP | 2000-194820 | 7/2000 |
| JP | 2001-14442 | 1/2001 |
| JP | 2001-167240 | 6/2001 |
| JP | 2001-334530 A | 12/2001 |
| JP | 2002-211755 A | 7/2002 |
| JP | 2002-236889 | 8/2002 |
| JP | 2003-16415 A | 1/2003 |
| JP | 2003-108962 | 4/2003 |

OTHER PUBLICATIONS

Abstract of JP2002211755 Jul. 31, 2002 Hirabayashi Isato.
Abstract of JP2002236889 Aug. 8, 23 Suzuta Masayoshi et al.
Abstract of JP3130484 Jun. 4, 1991 Tsuchiya Hiroshi et al.
Japanese Laid Open Patent Publication No. Sho 50-70602.
Japanese Patent Publication No. Sho-40-12241.

* cited by examiner

METHOD, SYSTEM, AND APPARATUS FOR DETACHING AND COLLECTING AN IC TAG FROM A PAPER SHEET TO WHICH IT IS ATTACHED

CROSS-REFERENCE TO RELATED APPLICATIONS

The present Application is based on International Application No. PCT/JP2004/00478, filed on Jan. 21, 2004, which in turn corresponds to JP 2003-013367 filed on Jan. 22, 2003, and priority is hereby claimed under 35 USC §119 based on these applications. Each of these applications are hereby incorporated by reference in their entirety into the present application.

TECHNICAL FIELD

The present invention relates generally to a technique for reusing IC tags used in the fields of physical distribution, etc., and more particularly to a method, system, and apparatus for detaching and collecting an IC tag from a paper sheet to which it is attached.

BACKGROUND ART

An IC tag, in which an IC chip and an antenna are interposed between two thin sheets, has recently been used as a medium for storing information. The IC tag has many advantages. For example, much information can be stored in the IC tag and information can be read out from the IC tag without contacting it. Thanks to these advantages, the IC tag is widely utilized in commodity management, physical distribution management, etc.

When using an IC tag in commodity management, physical distribution management, etc., it is normally attached to a commodity to be managed by an adhesive such as paste, double-coated tape, etc., whereby information stored in the IC tag is tied to the commodity. Because of this, if an IC tag is detached and it is attached to another commodity, the corresponding relationship between a commodity and information will be impaired. Hence, for example, in a technique disclosed in Japanese Laid-Open Patent Publication No. 2001-167240, when an IC tag attached once to a commodity is detached, it is destroyed so that the corresponding relationship between a commodity and information is not impaired.

In the above-described conventional technique, an IC tag is used only once and then it is thrown away. However, an IC tag can be used many times if it is rewritten from old information to new information, so it is wasteful to discard it without reusing. One IC tag is cheap, but if a great number of IC tags are used and all are discarded, the cost cannot be ignored. Because of this, depending on users, there is a demand for collecting and reusing IC tags used in order to reduce costs.

In order to collect an IC tag, it must be detached from a commodity to which it is attached. In most cases, an IC tag is attached to not a commodity itself but the packing paper or corrugated cardboard box, or a paper sheet such as a mount. The operation of detaching an IC tag from a paper sheet is performed by hand, and it is forcibly separated from the adhesive surface of a paper sheet. As in the above-described prior art, in the case where an IC will be damaged if it is separated by force, it is necessary to detach it so that it is not damaged.

In the case where IC tags are detached and collected by hand, as described above, there is a limit to the number of tags to be processed per person. Therefore, if the number of IC tags to be processed is increased, the number of persons increases accordingly. However, an increase in the number of persons increases lobar cost and often counterbalances the advantage of cost reduction to be obtained by collecting and reusing IC tags. For that reason, users who desire to collect and reuse IC tags require a method of efficiently detaching and collecting IC tags from a large quantity of paper sheets to which they are attached.

DISCLOSURE OF THE INVENTION

The present invention has been made in view of the circumstances described above. Accordingly, it is the primary object of the present invention to provide a method, system, and apparatus that are capable of efficiently detaching and collecting IC tags from a large quantity of paper sheets to which the IC tags are attached.

To achieve this end, there is provided a method of detaching and collecting an IC tag from a paper sheet to which the IC tag is attached. The method includes a detachment step of detaching the IC tag from the paper sheet by applying external force to an adhesive surface between the paper sheet and the IC tag, and a fractionation step of fractionating the detached IC tag from other substances.

In the aforementioned detachment step, the paper sheet may be immersed in an immersion liquid and external force may be applied to the adhesive surface by a flow of the immersion liquid.

The method of the present invention may further include a fragmentation step of immersing in an immersion liquid the paper sheet from which the IC tag was detached in the detachment step, and disintegrating (decomposing) or fragmenting the paper sheet into paper components by a flow of the immersion liquid and dispersing the paper components in the immersion liquid. The fragmentation step may be followed by the fractionation step.

In the aforementioned fractionation step, a suspension in which the paper components are dispersed by the flow of the immersion liquid may be passed through a screen.

In the method of the present invention, a pattern of direction and/or strength of the aforementioned flow may be changed. The flow may be a swirl flow moving in a vertical direction within a container, a swirl flow moving in a horizontal direction within a container, or a composite flow of these swirl flows. The direction of the aforementioned flow can be changed by switching between directions of positive and reverse rotations.

The method of the present invention may further include a cleaning step of cleaning the IC tag detached from the paper sheet to remove paper and/or an adhesive adhering to the IC tag.

The method of the present invention may further include a preparation step of swelling the paper sheet by causing the paper sheet to hold a swelling liquid in which paper and/or an adhesive is soluble. The preparation step may be followed by the detachment step.

In the aforementioned preparation step and/or cleaning step, the adhesive adhering to the IC tag may be disintegrated by an enzyme.

In the aforementioned fractionation step, the IC tag may be removed and collected from the suspension in which the paper components of the paper sheet are dispersed.

In the method of the present invention, the suspension may be put in a container, the IC tag in the suspension may be caused to sink to a bottom of the container, and by supplying a liquid flow containing small bubbles into the container, the bubbles may be caused to adhere to the paper components to float them up to a liquid surface of the container.

In the method of the present invention, heat may be applied to the immersion liquid and/or the swelling liquid.

In the method of the present invention, a plurality of IC tags may be successively processed as one bundle in each of the steps.

After collection of the IC tag in the aforementioned fractionation step, a liquid may be squeezed from the suspension and a residual substance of the suspension from which the liquid is squeezed may be used as paper material.

In the method of the present invention, the same liquid may be employed in each of the steps, and after collection of the IC tag in the fractionation step, a liquid may be squeezed from the suspension and the squeezed liquid may be reused in each of the steps.

To achieve the aforementioned object of the present invention, there is provided a system for detaching and collecting an IC tag from a paper sheet to which the IC tag is attached. The system includes a unit for swelling the paper sheet by causing the paper sheet to hold a swelling liquid in which paper and/or an adhesive is soluble, a detacher for detaching the IC tag from the paper sheet by applying external force to an adhesive surface between the swollen paper sheet and the IC tag, and a fractionator for fractionating the detached IC tag from other substances.

The system may further include a cleaner for cleaning the IC tag detached from the paper sheet to remove paper and/or an adhesive adhering to the IC tag.

To achieve the aforementioned object of the present invention, there is provided an apparatus for detaching and collecting an IC tag from a paper sheet to which the IC tag is attached. The apparatus includes a detaching container for storing a liquid; a solid type screen, which is provided within the detaching container and functions as a filter, for holding the paper sheet to which the IC tag is attached; an agitator for generating a flow of the liquid within the detaching container by agitating the liquid; and discharge ports, formed in side and/or bottom surfaces of the detaching container, for discharging paper components, passed through the solid type screen, of the paper components of the paper sheet fragmented within the solid type screen by the flow generated by the agitator.

The apparatus may further include a paper-component processing container for holding a suspension that contains paper components passed through the solid type screen, and separating the suspension into the paper components and a liquid; a suspension flow path for supplying the suspension from the discharge ports of the detaching container to the paper-component processing container; a return flow path for returning to the detaching container the liquid separated by the paper-component processing container; and a pump for circulating the liquid between the detaching container and the paper-component processing container, through the suspension flow path and the return flow path.

In the apparatus of the present invention, the aforementioned agitator may be equipped with an impeller and a drive unit for driving the impeller.

In the apparatus of the present invention, the agitator may operate between a first operating state in which a swirl flow of the liquid is generated within the detaching container in a direction of positive rotation and a second operating state in which the swirl flow is generated in a direction of reverse rotation. When agitating the liquid, the first operating state and the second operating state may be switched in predetermined cycles.

When switching the agitator between the first and second operating states, the agitator may be stopped for a predetermined time.

According to the tag detachment-collection method of the present invention described above, an IC tag can be efficiently detached and collected from a paper sheet.

According to the tag detachment-collection system of the present invention described above, a paper sheet is caused to hold a liquid in which paper and/or an adhesive is soluble, whereby the IC tag and the paper sheet become easy to detach. In this state, if external force is applied to the adhesive surface between the IC tag and the paper sheet, the IC tag can be readily detached from the paper sheet. Thus, it is possible to detach and collect the IC tag from the paper sheet efficiently.

According to the tag detachment-collection apparatus of the present invention described above, the IC tag is detached from the paper sheet within the solid type screen by a water flow generated by the agitator. The paper components of the paper sheet fragmented are passed through the solid type screen and are discharged from the detaching container through the discharge ports. In this way, the paper sheet and the IC tag can be reliably and efficiently detached.

BRIEF DESCRIPTION OF THE DRAWINGS

The present invention will be described in further detail with reference to the accompanying drawings wherein.

BEST MODE FOR CARRYING OUT THE INVENTION

Embodiments of the present invention will hereinafter be described in detail with reference to the drawings.

First Embodiment

Figure 1:
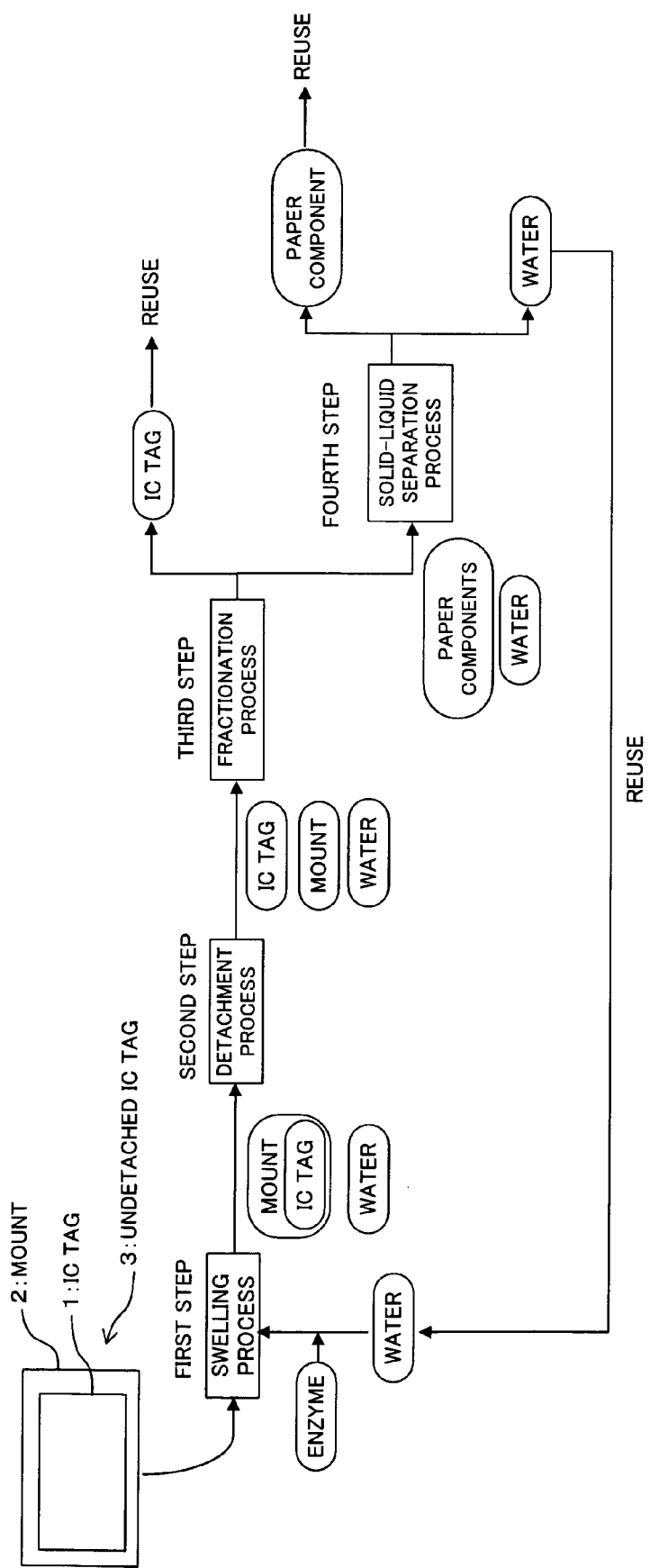
FIG. 1 is a processing flow diagram showing a tag detachment-collection method in accordance with a first embodiment of the present invention.

Referring to FIG. 1, there is shown a method of detaching and collecting an IC tag in accordance with a first embodiment of the present invention. As shown in the figure, an IC tag 1 adhering to a mount (paper sheet) 2 is collected. The IC tag 1 adhering to the mount 2 will hereinafter be referred to as an undetached IC tag 3. In this embodiment and a second embodiment that is to be described later, an adhesive for causing the IC tag 1 to adhere to the mount 2 employs starch paste. However, this adhesive may be chemical paste. The form of an adhesive may be any form if it can make the IC tag 1 adhere to the mount 2. For instance, it may be adhesive tape such as double-coated tape, etc.

The undetached IC tag 3 is first transferred to a first step (preparation step). In the first step, the undetached IC tag 3 is immersed in water. Since this embodiment uses starch paste as an adhesive for causing the IC tag 1 to adhere to the mount 2, an enzyme to decompose paste is added to water and the temperature of water is set to a temperature (e.g., 5 to 90° C., preferably 40 to 60° C.) at which an enzyme can decompose paste easily. The type of enzyme is determined, depending on the type of adhesive used. For example, in the case where an adhesive is starch paste, amylase can be employed. Also, the temperature of water is set in a temperature range where the decomposing ability of an enzyme is most activated, depending on the type of enzyme used.

Figure 2:
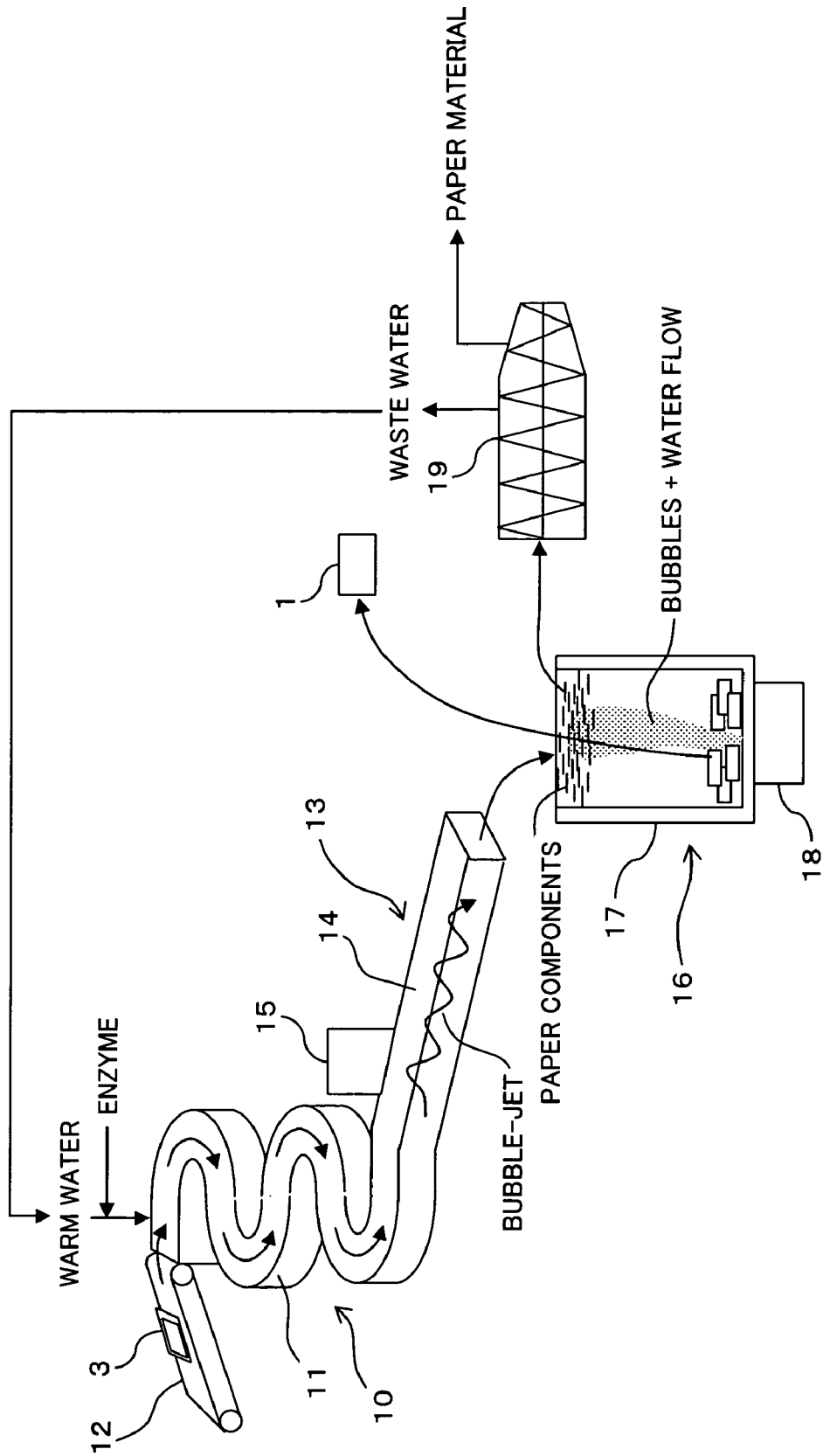
FIG. 2 is a schematic diagram showing a system for carrying out the tag detachment-collection method shown in FIG. 1.

Referring to FIG. 2, there is shown a system to carry out the tag detachment-collection method shown in FIG. 1. As shown in FIG. 2, the tag detachment-collection system of the first embodiment is made up of a swelling unit 10, a detacher 13, a fractionator 16, and a solid-liquid separator 19. The swelling unit 10, the detacher 13, the fractionator 16, and the solid-liquid separator 19 perform the steps shown in FIG. 1, respectively. The aforementioned first step is executed by the swelling unit 10.

The swelling unit 10 is equipped with a mender-shaped flow path 11, which is sloped so that water can flow slowly. Warm water containing an enzyme is continuously supplied to the most upstream portion of the flow path 11. The undetached IC tag 3 is transferred to the most upstream portion of the flow path 11 by a conveyer 12 and flows slowly through the flow path 11 along with warm water supplied. When the undetached IC tag is flowing through the flow path 11, the mount 2 holds water and swells. If water percolates up to the pasted surface (adhesive surface) between the IC tag 1 and the mount 2, the paste on the pasted surface is gradually dissolved in water and is decomposed by an enzyme contained in that water. The time during which the undetached IC tag 3 passes through the flow path 11, that is the processing time in the first step is set in consideration of the time from when water percolates up to the mount 2 to when an enzyme acts on the pasted surface between the IC tag 1 and the mount 2.

If the processing at the first step finishes, the undetached IC tag 3 is transferred to a second step (detachment step). The adhesive force between the IC tag 1 and the mount 2 is made very weaker in the first step, so it becomes easy to detach the IC tag 1 from the mount 2. In the second step, external force is applied to the pasted surface to detach the IC tag 1 from the mount 2. External force to be applied does not necessarily need to be a great force. Since the adhesive force between the IC tag 1 and the mount 2 has already been made sufficiently weak, even a weak force can easily detach the IC tag 1 from the mount 2 if processing is slowly performed over a long time. In the system shown in FIG. 2, the second step is executed by the detacher 13.

The detacher 13 is equipped with a second flow path 14, which is coupled to the exit of the first flow path 11 of the swelling unit 10. The aforementioned warm water flows from the first flow path 11 into the second flow path 14, along with the undetached IC tag 3. The second flow path 14 is provided with a jet unit 15, which is used to produce a jet containing bubbles. If a jet is sent out into a stream of water, the undetached IC tag 3 flowing along the second flow path 14 is agitated. If it is agitated, external force acts on the pasted surface between the IC tag 1 and the mount 2. The external force to act on the pasted surface is very weak, but since the adhesive force of the paste is made weak by the dissolution of the paste into water and the decomposition effect of an enzyme, the IC tag 1 is slowly detached from the mount 2 by that weak external force. The paste remaining on the detached IC tag 1 is decomposed by the action of an enzyme in warm water and is washed clean, and the mount 2 is gradually decomposed (disintegrated) into its fiber-shaped components by the solvent action of water relative to paper and the force of a jet.

If the processing at the second step finishes, the detached IC tag 1 and mount 2 are transferred to a third step (fractionation step). At this stage, the mount 2 has already been decomposed into its fiber-shaped components and dispersed in water, and the IC tag 1 has sunk under a suspension in which paper components are dispersed. In the third step, the IC tag 1 in the suspension is fractionated from other substances and is collected. In the system shown in FIG. 2, the third step is performed by the fractionator 16.

The fractionator 16 is equipped with a fractionation tank 17 provided near the exit of the second flow path 14. The suspension from the second flow path 14 is thrown into the fractionation tank 17 along with the IC tag 1. The bottom portion of the fractionation tank 17 is provided with a second jet unit 18, which is used to jet a stream of water that contains small bubbles. Small bubbles are produced from the bottom portion of the fractionation tank 17 toward the liquid surface. The difference in specific gravity between water and IC tag 1 causes the IC tag to sink to the bottom of the fractionation tank 17. On the other hand, the paper components in a suspension are typically dispersed within the fractionation tank 17 because a difference in specific gravity with water is small. However, bubbles produced from the bottom portion of the fractionation tank 17 adhere to paper components, so they become lighter in weight than water and float up to the liquid surface of the fractionation tank 17. Thus, the paper components and IC tag 1 are fractionated at the top and bottom of the fractionation tank 17. Therefore, the IC tag 1 can be collected from the bottom portion of the fractionation tank 17. In addition, if water overflowing the fractionation tank 17 is collected, a suspension containing paper of high concentration can be obtained.

If the processing at the third step finishes, the collected IC tag 1 is dried and reused. As previously described, the paste on the surface of the IC tag 1 is cleanly decomposed by an enzyme, so the collected IC tag 1 can be quickly reused. On the other hand, the suspension is transferred to a fourth step (water-squeezing step). In the fourth step, water is squeezed from the suspension and the remaining solid components are reused as paper material. The water squeezed from the suspension is transferred to the first step and is reused. Thus, the tag detachment-collection method of the present invention is capable of avoiding waste of resources by reusing substances other than IC tags. In addition, even in the case where squeezed water is discarded, influence on environment can be minimized, because an enzyme is used for decomposing paste. In the system shown in FIG. 2, the fourth step is carried out by the solid-liquid separator 19.

The solid-liquid separator 19 is used to separate solids and a liquid. More particularly, the separator 19 can employ a drum filter, a screw press, etc. The suspension containing paper of high concentration, collected from the fractionation tank 17, is thrown into the solid-liquid separator 19, in which water is squeezed from the suspension. Because the remaining solid components are paper components (paper fibers)

into which the mount 2 is decomposed (disintegrated), they are handled as paper material (wet pulp). On the other hand, the squeezed water is returned to the swelling unit 10, in which it is reused as water for swelling the mount 2.

Thus, according to the tag detachment-collection method and tag detachment-collection system of the first embodiment, the IC tag 1 can be efficiently detached from the mount 2 by processes of two stages, a static process at the first step and a dynamic process at the second step. In addition, the IC tag 1 can be detached from the mount 2 quite naturally, not forcibly. Therefore, there is no possibility that even in the case where the IC tag 1 has easy-to-destroy structure, it will be destroyed. Moreover, since the paste on the surface of the IC tag 1 is decomposed by an enzyme, a step of removing paste can be saved and the IC tag 1 can be quickly reused. Furthermore, the mount 2 is collected as paper material and water is returned to the first step, so waste of resources other than the IC tag 1 can be avoided.

Second Embodiment

Referring now to FIG. 3 to 9, there are shown a tag detachment-collection apparatus and a tag detachment-collection method in accordance with a second embodiment of the present invention.

Figure 3:
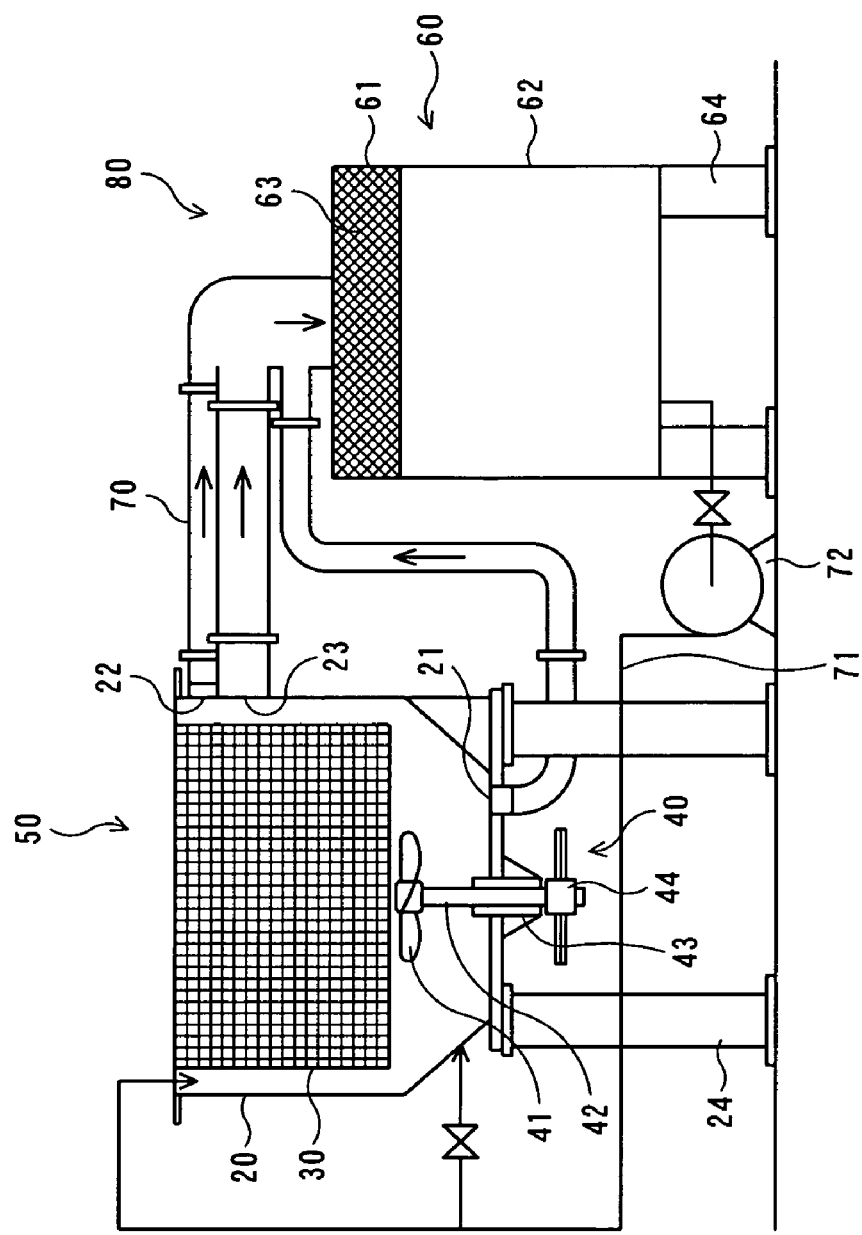
FIG. 3 is sectional side view schematically showing a tag detachment-collection apparatus constructed in accordance with a second embodiment of the present invention.
Figure 4:
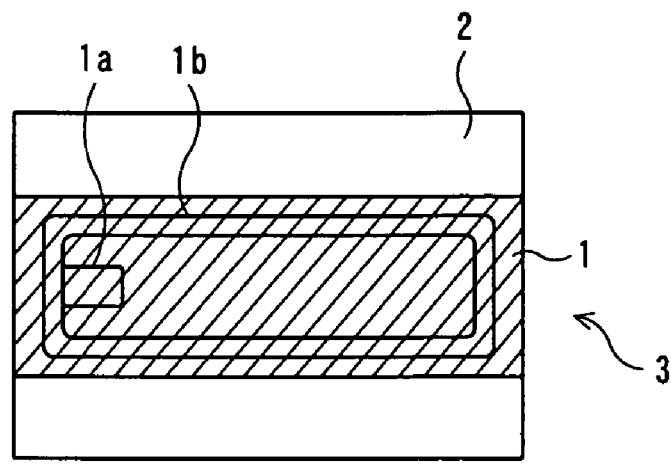
FIG. 4 is a schematic diagram showing an undetached IC tag used in the second embodiment of the present invention.
Figure 5:
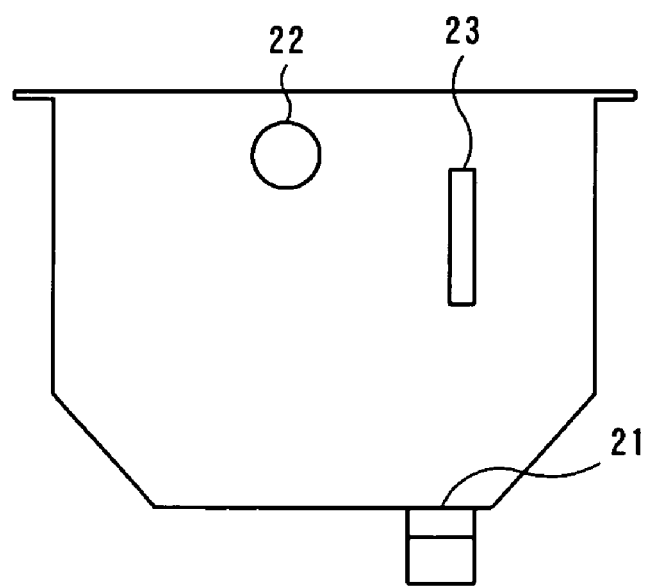
FIG. 5 is a diagram schematically showing the discharge ports of the tag detachment-collection apparatus constructed in accordance with the second embodiment of the present invention.
Figure 6:
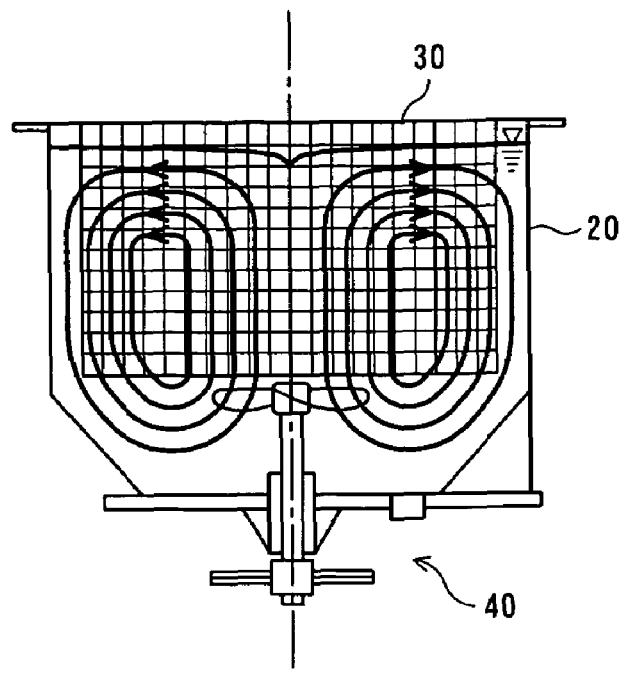
FIG. 6 is a diagram for explaining swirl flows generated within the detaching container in the direction of positive rotation by the agitator.
Figure 7:
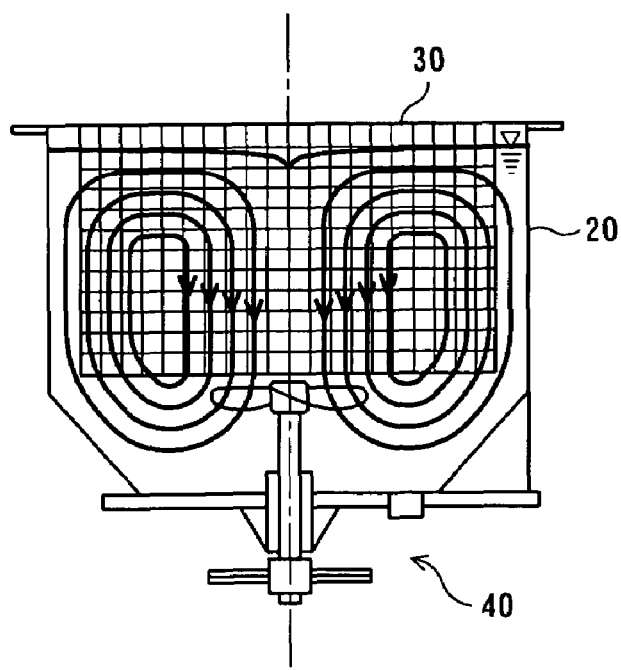
FIG. 7 is a diagram for explaining swirl flows generated within the detaching container in the direction of reverse rotation by the agitator.
Figure 8:
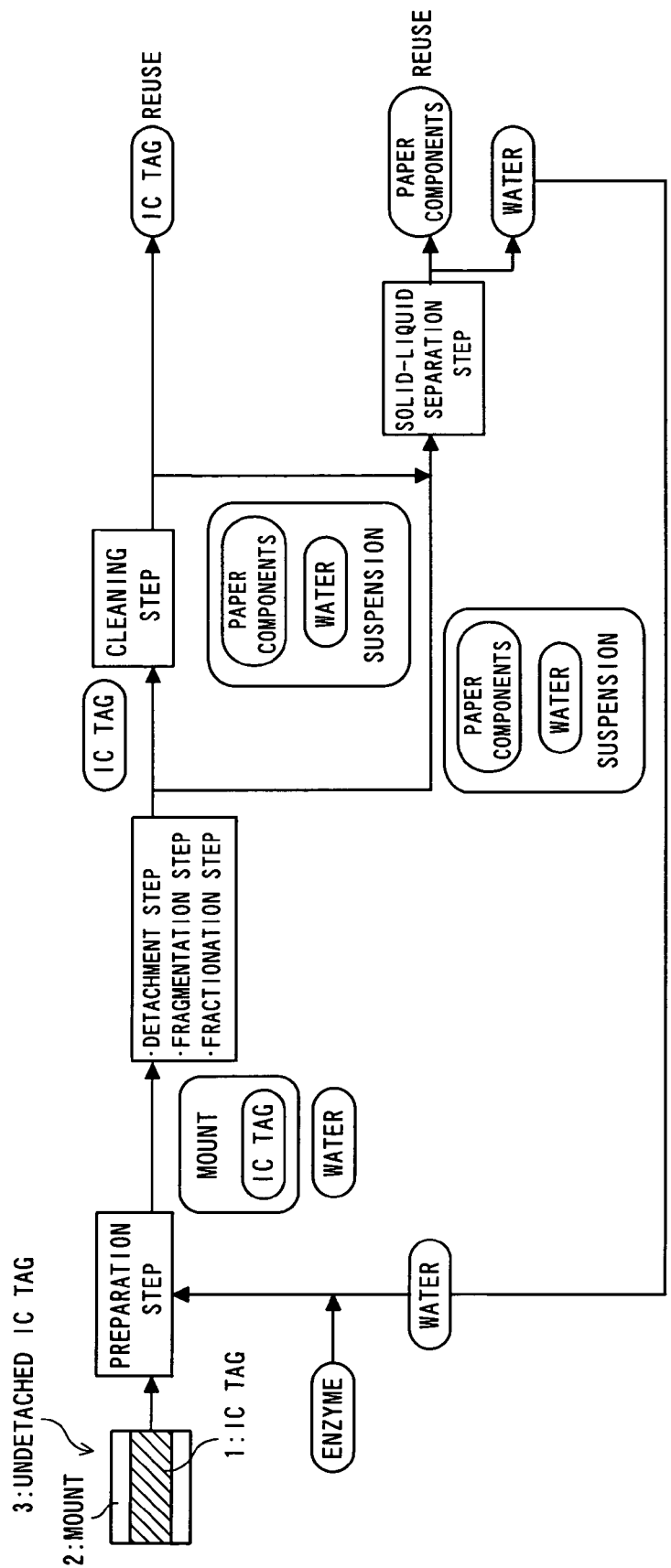
FIG. 8 is a processing flow diagram showing the tag detachment-collection method of the second embodiment.
Figure 9:
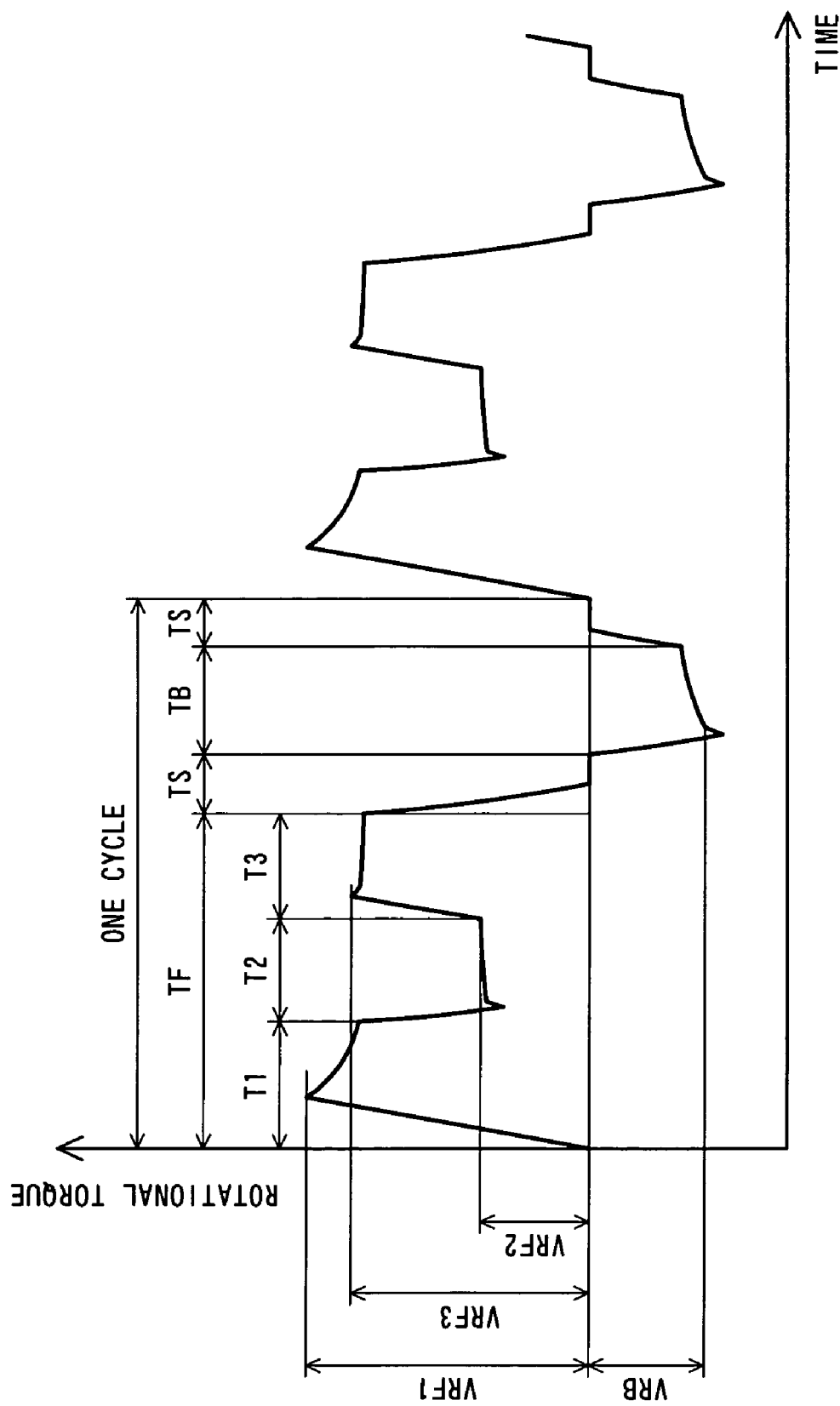
FIG. 9 is a timing diagram showing how the agitator of the tag detachment-collection apparatus is operated.

FIG. 3 is sectional side view schematically showing a tag detachment-collection apparatus constructed in accordance with a second embodiment of the present invention, FIG. 4 is a schematic diagram showing an undetached IC tag used in the second embodiment of the present invention, FIG. 5 is a diagram schematically showing the discharge ports of the tag detachment-collection apparatus constructed in accordance with the second embodiment of the present invention, FIG. 6 is a diagram for explaining swirl flows generated within the detaching container in the direction of positive rotation by the agitator, FIG. 7 is a diagram for explaining swirl flows generated within the detaching container in the direction of reverse rotation by the agitator, FIG. 8 is a processing flow diagram showing the tag detachment-collection method of the second embodiment, and FIG. 9 is a timing diagram showing how the agitator of the tag detachment-collection apparatus is operated.

As shown in FIG. 3, the tag detachment-collection apparatus includes a detacher 50 and a solid-liquid separator 80. The detacher 50 consists of a detaching container 20, a solid type screen 30, and an agitator 40. The solid-liquid separator 80 consists of a paper-component processing container 60, a suspension flow path 70, a return flow path 71, and a circulating pump 72.

The detaching container 20 of the detacher 50 holds liquid such as water and also stores an undetached IC tag 3 (which is an IC tag 1 pasted to a mount (paper sheet) 2) shown in FIG. 4. Note that the IC tag 1 is formed by sealing off an antenna 1b connected to an IC chip or tag 1a within a resin film such as PET.

The detaching container 20 is made up of an upper layer portion formed in cylindrical form, and a lower layer portion having an inclined surface that connects the side surface of the upper portion with the bottom surface of the detaching container 20. The detaching container 20 is installed on a pedestal 24.

As shown in FIG. 5, the detaching container 20 is further provided with discharge ports 21, 22, and 23 through which substances (a suspension in which paper components are dispersed, etc.) passed through the solid type screen 30 are discharged from the detaching container 20. The discharge port 21 is provided at the bottom of the detaching container 20, and the discharge ports 22, 23 are provided at the side surface of the upper portion of the detaching container 20. The intermediate discharge port 23 is used to discharge the above-described substances from the side surface the detaching container 20, and extends vertically along the side surface the detaching container 20 in order to reliably discharge the above-described substances from that side surface. The upper discharge port 22 is provided at the water-level position of the above-described liquid in the upper layer portion of the detaching container 20 and is constructed so that the aforementioned substances suspended in the aforementioned liquid are discharged from the detaching container 20.

The solid type screen 30 is arranged within the detaching container 20 and holds the IC tag 1 and mount 2 (undetached paper sheet 3) within the detaching container 20 so that they are not moved into the gap between the detaching container 20 and the solid type screen 30. The solid type screen 30 also functions as a filter that allows only solid particles of predetermined sizes to pass through it. The solid type screen 30 is constructed of a wire net and is formed into a cylindrical cage. The solid type screen 30 is arranged so that a gap of a predetermined size is formed between it and the wall surface of the detaching container 20.

The agitator 40 is used to generate a flow of water within the detaching container 20 by agitating the liquid within the detaching container 20. The agitator 40 is equipped with an impeller 41 for producing a flow of water by rotating, a shaft 42 for transmitting turning force to the impeller 41, a packing 43 interposed between the shaft 42 penetrating the bottom portion of the detaching container 20 and the center hole of the detaching container 20, and a driving-force transmitting member 44, mounted on the shaft 42 and connected to a drive unit such as a drive motor (not shown), for rotating the shaft 42. Note that the drive unit is connected with a controller (not shown) for controlling rotation of the impeller 41. And the agitator 40 is constructed so it can rotate the impeller 41 in both directions of positive rotation and reverse rotation.

Furthermore, the impeller 41 of the agitator 40 is provided on the center axis of the bottom surface of the detaching container 20 and near the solid type screen 30. Of course, the impeller 41 is arranged at a position a predetermined distance away from the bottom surface of the detaching container 20 without contacting the solid type screen 30.

As shown in FIG. 6, if the impeller 41 of the agitator 40 is rotated in the direction of positive rotation, swirl flows (swirl flows in the direction of positive rotation) in which the center portion of the detaching container 20 moves upward are generated within the detaching container 20 (first operating state). Also, as shown in FIG. 7, if the impeller 41 of the agitator 40 is rotated in the direction of reverse rotation, swirl flows (swirl flows in the direction of reverse rotation) in which the center portion of the detaching container 20 moves downward are generated within the detaching container 20 (second operating state).

Note that the swirl flows in the directions of positive and reverse rotations contain the swirl components of the swirl flows generated in the direction of the rotation of the impeller 41. That is, a composite swirl flow, containing vertical swirl flows and horizontal swirl flows, is formed. The swirl flows in the directions of position and reverse rotations can be generated reliably and more strongly, because the impeller 41 is installed at the position a predetermined distance away from the bottom surface of the detaching container 20 and the lower layer portion of the detaching container 20 has an inclined surface.

The paper-component processing container 60 of the solid-liquid separator 80 holds the suspension in which the paper components of the mount 2 passed through the solid type screen 30 are dispersed, and is used to separate this suspension into paper components and a liquid. The paper-component processing container 60 is divided into two or more layers. In this embodiment, it consists of two layers, an upper layer portion 61 and a lower layer portion 62. The upper layer portion 61 is equipped with a collecting filter 63 for filtering the suspension to collect paper components and allowing only a liquid (water) to pass to the lower layer portion 62. The paper-component processing container 60 is installed on a pedestal 64.

The suspension flow path 70 of the solid-liquid separator 80 is connected to the discharge ports 21, 22, and 23 of the detaching container 20 to supply the suspension to the paper-component processing container 60. The suspension flow path 70 is also connected to the top surface of the paper-component processing container 60 in order to supply the suspension from the uppermost portion of the paper-component processing container 60.

The return flow path 71 of the solid-liquid separator 80 is a flow path for returning to the detaching container 20 the liquid in which paper components are removed by the paper-component processing container 60. Therefore, it is connected to the bottom surface of the paper-component processing container 60 and to the top and side surfaces of the detaching container 20.

The circulating pump 72 of the solid-liquid separator 80 is used to circulate a liquid (water) between the detaching container 20 and the paper-component processing container 60, through the suspension flow path 70 and return flow path 71.

In FIG. 3, each of the arrows on the supply passage 70 indicates a direction in which a liquid flows through the supply passage 70. Although shown by a solid line, the return flow path 71 consists mainly of pipes and valves, as with the supply passage 70.

A description will hereinafter be given of how an IC tag 1 pasted (attached) to a paper sheet 2 is detached and collected by the tag detachment-collection method of the second embodiment. As shown in FIG. 8, in the tag detachment-collection method of the second embodiment, a preparation step is first performed. In this preparation step, by storing water and an enzyme in the detaching container 20, holding a great number of undetached IC tags 3 (e.g., a few hundred sheets to a few thousand sheets) within the solid type screen 30, and immersing the undetached IC tags 3 into a liquid (swelling liquid) containing the aforementioned water and enzyme for a predetermined time, the undetached IC tags 3 are swollen with the swelling liquid to make it easier to detach the IC tag 1 from the mount 2. The time during which the undetached IC tag 3 is immersed in the swelling liquid is determined in consideration of the time from when the swelling liquid percolates up to the mount 2 to when an enzyme acts on the pasted surface (adhesive surface) between the IC tag 1 and the mount 2. The temperature of water is set to a temperature (e.g., 5 to 90° C., preferably 40 to 60° C.) at which an enzyme can easily act on paste. The type of enzyme is determined, depending on the type of adhesive used.

If the preparation step finishes, a detachment step is performed. In the detachment step, the agitator 40 generates swirl flows by agitating the swelling liquid held in the detaching container 20. These swirl flows cause external force to act on the pasted surface (adhesive surface) between the IC tag 1 and the mount 2. As a result, the IC tag 1 is detached from the mount 2.

And if, within the solid type screen 30 arranged within the detaching container 20, the aforementioned swirl flows further act on the mount 2 from which the IC tag 1 is detached in the detachment step, a fragmentation step is performed. In the fragmentation step, the mount 2 is disintegrated and fragmented and the paper components are dispersed in a liquid.

Only the liquid in which the aforementioned paper components are dispersed (hereinafter referred to as a suspension) is passed through the solid type screen 30 by the aforementioned swirl flows and is discharged out of the detaching container 20 through the discharge ports 21, 22, and 23. In this way, the IC tag 1 within the solid type screen 30 is fractionated from the suspension (fractionation step).

Thus, in the tag detachment-collection method of the second embodiment, the detachment step, fragmentation step, and fractionation step are performed in sequence for each of the undetached IC tags 3 held in the solid-type screen 30. That is, each of these steps is performed for each of the IC tags 3. Therefore, within the detaching container 20, there are cases where while an undetached IC tag 3 is being processed in the fractionation step, other undetached IC tags 3 are being processed in the detachment or fragmentation step. Within the detaching container 20, the above-described steps are performed in sequence on each of the undetached IC tag 3.

If the fractionation step finishes, a cleaning step is performed. In the cleaning step, paper or paste, which remains attached to the IC tag 1 detached within the solid type screen 30 from the mount 2 by the aforementioned swirl flows, is removed from the IC tag 1. The cleaning step may be performed for each of the undetached IC tags 3, as with the aforementioned detachment step, fragmentation step, and fractionation step, or it may be performed after the fractionation step is performed on all of the undetached IC tags 3 held in the solid type screen 30.

If the processing at the cleaning step finishes, the collected IC tag 1 is dried and reused. Because the IC tag 1 is cleanly washed by an enzyme in the cleaning step, therefore the collected IC tag 1 can be quickly reused.

On the other hand, the suspension discharged from the discharge ports 21, 22, and 23 is processed in a solid-liquid separation step. In this solid-liquid separation step, the suspension discharged from the discharge ports 21, 22, and 23 is supplied to the upper layer portion 61 of the paper-component processing container 60 through the suspension flow path 70 of the solid-liquid separator 80. If the suspension is passed through the collecting filter 63, paper components in the suspension are filtered and only water passes to the lower layer portion 62. In this way, the solid-liquid separation step is performed.

The water obtained in the solid-liquid separation step is returned to the detaching container 20 through the return flow path 71. That is, in the detachment-collection apparatus of the second embodiment, water is circulated between the detacher 50 and the solid-liquid separator 80. On the other hand, the paper components in the suspension collected by the collecting filter 63 are collected from the collecting filter 63 and are reused.

If swirl flows in the direction of positive rotation (see FIG. 6) are generated within the detaching container 20 for a certain fixed time by rotating the impeller 41 of the agitator 40 in the direction of positive rotation, IC tags 1 and mounts 2 or undetached IC tags 3 (hereinafter referred to simply as IC tags and paper sheets when IC tags 1 and mounts 2 are not discriminated from undetached IC tags 3) will be pressed against the side surface of the solid type screen 30. Similarly, if swirl flows in the direction of reverse rotation (see FIG. 7) are generated within the detaching container 20 for a certain fixed time by rotating the impeller 41 of the agitator 40 in the direction of reverse rotation, IC tags 1 and mounts 2 or undetached IC tags 3 will be pressed against the side surface of the solid type screen 30.

Thus, if IC tags and paper sheets are pressed against the side surface or bottom surface (hereinafter referred to simply as the wall surface when the side surface is not discriminated from the bottom surface) of the solid type screen 30, the filtering function of the solid type screen 30 will be considerably reduced. In addition, it becomes difficult to apply the external force, produced by the aforementioned swirl flows, to the IC tags and paper sheets pressed against the wall surface. Therefore, the processing at each of the detachment, fragmentation, and fractionation steps is not efficiently performed. Moreover, there is a possibility that the IC chip 1$a$ or antenna 1$b$ of the IC tag 1 will be destroyed by a shock produced when IC tags 1 or undetached IC tags 3 are pressed against the wall surface of the solid-type screen 30.

Hence, in the tag detachment-collection method of the second embodiment, the agitator 40 is operated as shown in FIG. 9 in order to switch the aforementioned swirl flow between the directions of positive and reverse rotations. That is, the first operating state (positive rotation) and second operating state (reverse rotation) are switched in order to solve the above-described problems and thereby perform the detachment, fragmentation, and fractionation steps efficiently.

As shown in FIG. 9, in the detachment, fragmentation, fractionation, and cleaning steps, the tag detachment-collection method of the second embodiment controls rotation of the agitator 40 (i.e., impeller 41) so that one cycle of positive rotation (TF), stop (TS), reverse rotation (TB), and stop (TS) is continuously performed. The positive-rotation operating period TF is segmented into periods T1, T2, and T3, and each period varies in torque and number of rotations. That is, the positive-rotation torque of the impeller 41 increases up to VRF1 for the period T1, then decreases down to VRF2 for the period T2, and finally increases up to VRF3 for the period T3 (VRF2<VRF3<VRF1). Note that in the reverse-rotation operating period TB, the reverse-rotation torque of the impeller 41 increases up to VRB.

Therefore, within the detaching container 20, swirl flows in the direction of positive rotation where the water in the central portion of the detaching container 20 moves upward (see FIG. 6) are generated for the positive-rotation operating period TF in the detachment, fragmentation, fractionation, and cleaning steps (first operating state), and the operating pattern (torque and number of rotations) is changed for periods T1 to T3. Therefore, during the positive-rotation operating period TF, swirl flows are generated in random directions of positive rotation. Next, in the stop period TS, the operation of the agitator 40 is stopped. After the swirl flows in the direction of positive rotation within the detaching container 20 becomes weak to some degree, the rotation direction of the impeller 41 is switched from positive rotation to reverse rotation during the reverse-rotation operating period TB. Therefore, within the detaching container 20, swirl flows in the direction of reverse rotation where the water in the central portion of the detaching container 20 moves downward (see FIG. 7) are generated (second operating state). That is, the operation of the agitator 40 is switched from the first operating state to the second operating state, whereby the direction of the swirl flows within the detaching container 20 is switched from the direction of positive rotation to the direction of reverse rotation. In addition, the stop period TS is provided after the reverse-rotation operating period TB, so the swirl flows in the direction of reverse direction becomes weak to some degree. And during the positive-rotation operating period TF of the next cycle, the direction of the swirl flows within the detaching container 20 is switched from the direction of reverse rotation to the direction of positive rotation.

Thus, a pattern of direction and strength of the swirl flows within the detaching container 20 is frequently changed, so IC tags and paper sheets are constantly moved without being stopped within the solid type screen 30. Therefore, IC tags and paper sheets are prevented from being pressed against the wall surface of the solid type screen 30. In addition, since the aforementioned swirl flows are not uniform in direction, external forces of various directions and strengths are applied to IC tags and paper sheets. As a result, the effect of detaching the IC tag 1 in the detachment step, the effect of fragmenting the mount 2 in the fragmentation step, the fractionating effect in the fractionation step, and the effect of cleaning the IC tag 1 in the cleaning step are respectively enhanced and these steps are efficiently performed.

Even when IC tags and paper sheets are pressed against the wall surface of the solid type screen 30, the agitator 40 is stopped during the stop period TS and the swirl flows within the detaching container 20 are made weak, so that the IC tags and paper sheets are removed from the wall surface. In addition, the rotation direction of the swirl flow is switched between positive and reverse rotations, so IC tags and paper sheets are more reliably prevented from being pressed against the wall surface of the solid type screen 30.

When switching the swirl flow within the detaching container 20 between the directions of positive and reverse rotations (when switching the operation of the agitator 40 between the first and second operating states), composite water flows are generated. Thanks to these composite water flows, the aforementioned effects in the detachment, fragmentation, fractionation, and cleaning steps are further enhanced.

Thus, according to the tag detachment-collection method and apparatus of the second embodiment, the same advantages as the first embodiment can be obtained.

In addition, in the second embodiment, a plurality of undetached IC tags 3 are processed as a bundle within the solid type screen 30 in the steps from preparation to cleaning (particularly, the steps from detachment to fractionation), so the IC tags 1 pasted (adhered) to the mounts 2 can be efficiently detached and collected. That is, in the second embodiment, within one container the steps from detachment to fractionation are performed in sequence for each of the undetached IC tags 3, so each step is performed in parallel on the undetached IC tags 3. Particularly, the steps from detachment to fractionation can be efficiently performed.

In the second embodiment, the operation of the agitator 40 is switched between the first and second operating states, whereby the pattern of swirl flows generated within the detaching container 20 is changed. Particularly, the direction of swirl flows is switched between positive rotation and reverse rotation, so IC tags and paper sheets are prevented from being pressed against the solid type screen 30 and the processing effect in each step can be enhanced.

In the second embodiment, swirl flows are also generated in the rotation directions of the impeller 41 of the agitator 40, whereby the processing in each step can be more reliably performed.

The bubbles produced within the detaching container 20 by the agitator 40 adhere to paper components contained in a suspension, whereby these paper components are suspended in the upper layer portion of the detaching container 20. In the second embodiment, the upper layer portion of the detaching container 20 is provided with discharge ports 22 and 23, so in the fractionation step the suspension passed through the solid type screen 30 can be efficiently discharged out of the detaching container 20. That is, since the discharge ports 22 and 23 can enhance the ratio of removing paper components within the detaching container 20, the processing efficiency in the fractionation step can be enhanced.

[Others]

While the present invention has been described with reference to the preferred embodiments thereof, the invention is not to be limited to the details given herein, but may be modified within the scope of the invention hereinafter claimed.

For example, although the tag detachment-collection system of the first embodiment is constructed so that undetached IC tags collected are sequentially processed, it may be constructed so that a plurality of undetached IC tags are processed as one bundle. This renders it possible to process a great quantity of IC tags efficiently.

In the first and second embodiments, the IC tag fractionated in the third step (fractionation step) is dried and reused. However, the present invention may further include a step of inspecting whether paste is completely removed from an IC tag collected. And an accepted product in which past (adhesive) is completely removed is dried and reused. On the other hand, a rejected product on which paste remains is again transferred to the first step (preparation step). For instance, in the case of the system shown in FIG. 2, a rejected product is thrown into the swelling unit 10 along with an undetached IC tag 3, and the remaining paste (adhesive) is decomposed by an enzyme. Or the first embodiment may further include a step of removing paste, by providing, on the downstream side of the fractionator 16 of the system shown in FIG. 2, a cleaner for cleaning an IC tag to remove paper and/or paste adhering to the IC tag, and cleaning a rejected product with a cleaning liquid.

In the first and second embodiments, starch paste is used as an adhesive, so an enzyme is added to water to decompose this paste. However, an enzyme is dispensable. For example, in the case where starch paste is used as an adhesive, it is soluble in water. Therefore, if amount is swollen with water, paste dissolves gradually in water and an IC tag is detached easily from the mount. However, in this case, it is difficult to cleanly remove paste from an IC tag detached and collected, so the IC tag needs to be cleaned with a cleaning liquid.

The liquid for swelling a mount, used in the first step (preparation step), is not limited to water. It may be determined, depending on the type of adhesive used. For instance, water may be employed in the case of a water soluble type adhesive that loses adhesive property when contacted with water. An alkali solution may be employed in the case of an alkali soluble type adhesive that loses adhesive property when contacted with the alkali solution. An organic solvent may be used in the case of an adhesive soluble in it.

In the second embodiment, the tag detachment-collection apparatus is provided with the solid-liquid separator 80, and the tag detachment-collection method performs a solid-liquid separation step. However, in the tag detachment-collection apparatus and method of the present invention, the solid-liquid separator and the solid-liquid separation step are dispensable. Therefore, the solid-liquid separator and the solid-liquid separation step may be omitted.

In the second embodiment, the preparation step is performed by the detaching container 20, but it may be performed by another device. The preparation step may be omitted. In such a case, an undetached IC tag 3 needs to be sufficiently immersed in water (or water containing an enzyme) in the detachment step.

In the second embodiment, the agitator 40 of the tag detachment-collection apparatus is provided with the impeller 41 for generating swirl flows within the detaching container 20. However, the present invention is not limited to the agitator 40, but may employ any type of agitator if it can generate swirl flows within the detaching container 20 in the directions of positive and reverse rotations.

In the third step (fractionation step) of the first embodiment, the IC tag 1 sinks to the bottom of the fractionation tank 17, and paper components in the suspension with bubbles adhering thereto float up to the liquid surface of the fractionation tank 17. In this way, the IC tag 1 is fractionated from paper components. However, the present invention is not limited to the third step (fractionation step) of the first embodiment. For example, if bubbles generated from the bottom portion of the fractionation tank 17 adhere to the IC tag 1, it becomes lighter in weight than water and floats up to the liquid surface of the fractionation tank 17. And if the IC tag 1 floating on the liquid surface is taken out of the fractionation tank 17, the IC tag 1 can be fractionated from paper components in the suspension.

In the second embodiment, it has been described that in the fractionation step, only paper components in a suspension float up to the liquid surface of the detaching container 20. However, there are cases where bubbles adhere to the IC tag 1 and therefore the IC tag itself floats up to the liquid surface of the detaching container 20. In the second embodiment, the IC tag 1 and paper components can be reliably detached by the solid type screen 30, so the presence or absence of the floating of the IC tag 1 within the detaching container 20 has no influence on the detachment of the IC tag 1 from paper components. Similarly, even when paper components are dispersed in a suspension and only the IC tag 1 floats up to the liquid surface of the detaching container 20, the IC tag 1 and paper components can be reliably detached and therefore the same advantage as the second embodiment can be obtained.

In the first and second embodiments, while the IC tag 1 adheres to the obverse side of the paper sheet 2, it may adhere to the reverse side. In addition, paper sheets may adhere to both sides of the IC tag 1, respectively. Furthermore, the IC tag 1 may be interposed between paper sheets.

INDUSTRIAL APPLICABILITY

According to the present invention, as described above, an IC tag can be efficiently detached and collected from a paper sheet to which the IC tag is attached. Therefore, in systems where an IC tag is attached to a paper sheet and used, the present invention can be widely applied when reusing IC tags.

For example, in the fields of physical distribution, etc., there are cases where an IC tag is attached to a slip (paper sheet) and used. In such a case, the present invention is suitable for reusing IC tags and its utilization is extremely high.

The invention claimed is:

1. A system for detaching and collecting an IC tag from a paper sheet to which said IC tag is attached, comprising:
   a unit for swelling said paper sheet by soaking said paper sheet in a swelling liquid in which paper and/or an adhesive is soluble;
   a detacher for detaching said IC tag from said paper sheet by applying an agitating stream of the liquid to an adhesive surface between the swollen paper sheet and said IC tag in the liquid, to agitate and separate said IC tag from said paper sheet, and to decompose the paper sheet into paper components; and
   a fractionator for fractionating the detached IC tag from the paper components from said detacher, wherein said swelling unit pours the liquid, in which said paper sheet and said IC tag are soaked, into said detacher.

2. The system as set for in claim 1, further comprising:
a cleaner for said IC tag detached from said paper sheet to remove paper and/or an adhesive adhering to said IC tag.

3. The system as set for in claim 1, wherein the detacher immerses said paper sheet and said IC tag in the water while said paper sheet and said IC tag are exposed to agitation by the agitating stream of water.

4. The system as set forth in claim 3, wherein the agitating stream of water comprises a jet of bubble filled water which decompose the paper sheet into the paper components.

5. The apparatus as set forth in claim 1, wherein the fractionator comprises a liquid filled vessel which is separate from the detacher and arranged to receive the IC tag and the paper components from the detacher, the fractionator having an agitation unit which agitates liquid in the liquid filled vessel and which separates the IC tag from the paper components and causes the paper components to collect near an upper surface of the liquid.

6. The apparatus as set forth in claim 1, wherein the fractionator comprises a liquid filled vessel in which the detacher is disposed, the detacher comprising a screen which retains the IC tag and which allows the paper components to pass through the screen into the vessel.

7. The system as set forth in claim 1, wherein the unit for swelling the paper which is filled with a swelling liquid, comprises a sluiceway-like arrangement along which the paper sheet flows, and wherein the detacher comprises a downstream portion of the sluiceway-like arrangement which is equipped with an agitation unit to agitate the liquid, separate said IC tag from said paper sheet, and decompose the paper sheet into the paper components.

* * * * *